United States Patent
Lv et al.

(10) Patent No.: US 12,163,978 B2
(45) Date of Patent: Dec. 10, 2024

(54) IDENTIFYING METHOD AND IDENTIFYING SYSTEM FOR CENTRIFUGE ROTOR

(71) Applicants: QINGDAO HAIER BIOMEDICAL TECHNOLOGY CO., LTD., Qingdao (CN); QINGDAO HAIER BIOMEDICAL CO., LTD., Qingdao (CN)

(72) Inventors: Kaixiong Lv, Qingdao (CN); Zhanjie Liu, Qingdao (CN); Haitao Chen, Qingdao (CN); Xianshuang Tang, Qingdao (CN); Shufei Song, Qingdao (CN); Menglong Yin, Qingdao (CN); Zepeng Duan, Qingdao (CN); Xinyuan Gan, Qingdao (CN)

(73) Assignees: QINGDAO HAIER BIOMEDICAL TECHNOLOGY CO., LTD., Qingdao (CN); QINGDAO HAIER BIOMEDICAL CO., LTD., Qingdao (CN)

( * ) Notice: Subject to any disclaimer, the term of this patent is extended or adjusted under 35 U.S.C. 154(b) by 0 days.

(21) Appl. No.: 18/263,878

(22) PCT Filed: Jan. 24, 2022

(86) PCT No.: PCT/CN2022/073374
§ 371 (c)(1),
(2) Date: Aug. 1, 2023

(87) PCT Pub. No.: WO2022/247328
PCT Pub. Date: Dec. 1, 2022

(65) Prior Publication Data
US 2024/0118303 A1     Apr. 11, 2024

(30) Foreign Application Priority Data
May 28, 2021 (CN) .......................... 202110595288.1

(51) Int. Cl.
*G01P 3/481* (2006.01)

(52) U.S. Cl.
CPC .................................... *G01P 3/481* (2013.01)

(58) Field of Classification Search
CPC ............................. G01P 3/481; B04B 13/003
See application file for complete search history.

(56) References Cited

U.S. PATENT DOCUMENTS

| 2003/0020428 A1 | 1/2003 | Masaki et al. |
| 2007/0048814 A1* | 3/2007 | Edwards ........ C12Y 403/03007 435/23 |

(Continued)

FOREIGN PATENT DOCUMENTS

| CN | 1476599 A | 2/2004 |
| CN | 101162156 A | 4/2008 |

(Continued)

OTHER PUBLICATIONS

International Search Report issued in corresponding PCT Application No. PCT/CN2022/073374, dated Apr. 14, 2022.

(Continued)

*Primary Examiner* — Christopher P McAndrew
*Assistant Examiner* — Zannatul Ferdous
(74) *Attorney, Agent, or Firm* — Westbridge IP LLC

(57) ABSTRACT

Disclosed are an identifying method and an identifying system for a centrifuge rotor. The identifying method for a centrifuge rotor is based on a centrifuge rotor identifying system which includes a code disk with a plurality of pairs of magnetic poles, a Hall sensor and a controlling device. The method includes the following steps: according to a predetermined code rule, detecting the duration of each level signal generated from the Hall sensor; according to the total number of windows of the code disk and the duration of each level signal, determining the preliminary code; according to (Continued)

the predetermined code rule, determining the code starter; and based on the code starter, ordering the preliminary code to the rotor final code.

18 Claims, 3 Drawing Sheets

(56) References Cited

U.S. PATENT DOCUMENTS

| | | | | |
|---|---|---|---|---|
| 2008/0108793 | A1* | 5/2008 | Berman | C07K 14/195 435/7.32 |
| 2009/0132178 | A1* | 5/2009 | Dharamsi | G16B 15/30 435/189 |
| 2014/0167674 | A1 | 6/2014 | Wang et al. | |

FOREIGN PATENT DOCUMENTS

| | | |
|---|---|---|
| CN | 104246826 A | 12/2014 |
| CN | 104422468 A | 3/2015 |
| CN | 105722776 A | 6/2016 |
| CN | 106788083 A | 5/2017 |
| CN | 107687865 A | 2/2018 |
| CN | 108474673 A | 8/2018 |
| CN | 109374022 A | 2/2019 |
| CN | 109871043 A | 6/2019 |
| CN | 110120768 A | 8/2019 |
| CN | 211296482 U | 8/2020 |
| CN | 112187369 A | 1/2021 |
| JP | H05180666 A | 7/1993 |
| JP | 2015148635 A | 8/2015 |

OTHER PUBLICATIONS

Written Opinion issued in corresponding PCT Application No. PCT/CN2022/073374, dated Apr. 14, 2022.
First Office Action issued in counterpart Chinese Patent Application No. 202110595288.1, dated May 9, 2024.
Notice of Reasons for Refusal issued in counterpart Japanese Patent Application No. JP 2023-522357, dated Apr. 23, 2024.

* cited by examiner

IDENTIFYING METHOD AND IDENTIFYING SYSTEM FOR CENTRIFUGE ROTOR

CROSS-REFERENCE TO RELATED APPLICATIONS

This application is a national stage of International Application No. 9PCT/CN2022/073374, filed on Jan. 24, 2022, which claims priority to Chinese Patent Application No. 202110595288.1, filed on May 28, 2021, the contents of which are incorporated herein by reference in their entirety.

TECHNICAL FIELD

The present disclosure relates to the technical field of rotor identification, for example, to an identifying method and an identifying system for a centrifuge rotor.

BACKGROUND

At present, centrifuge rotor identification is mainly divided into three categories: rotor identification based on photoelectric code, rotor identification based on magneto-electric code, and rotor identification based on RFID (Radio Frequency Identification). Among them, rotor identification based on magnetoelectric code has better stability and lower cost and is widely used.

In the practice of the embodiment of the present disclosure, it is found that at least the following problems of the related technology.

The rotor identification types by conventional magnetoelectric code are insufficient, and the number of the rotor identifiable types can be increased only by increasing the number of windows.

SUMMARY

In order to have a basic understanding of some aspects of the disclosed embodiments a brief summary is given below. The summary is not intended to be a general comment or to identify crucial/essential constituent elements or to describe the protection scope of these embodiments but rather to serve as a preface to the detailed description that follows.

The embodiments of the present disclosure provide an identifying method and an identifying system for a centrifuge rotor to solve the technical problem that the number of the rotor identifiable types can be increased only by increasing the number of windows.

In some embodiments, the method is based on an identifying system for a centrifuge rotor, the system includes a code disk having a plurality of pairs of magnetic poles. The method includes: according to a predetermined code rule, detecting a duration of each level signal generated from a Hall sensor with the code disk having one revolution, according to a total number of windows of the code disk and the duration of each level signal, determining a preliminary code, and according to the predetermined code rule, determining a code starter. Based on the code starter, ordering the preliminary code to obtain a rotor final code.

In some embodiments, the system includes a code disk having a plurality of pairs of magnetic poles, a Hall sensor, a processor, and a memory storing program instructions. The Hall sensor is bipolar and has a latch function. The processor is configured to execute the identifying method described above for a centrifuge rotor with the program instructions operated.

The identifying method and the identifying system for the centrifuge rotor provided by the embodiment of the present disclosure can achieve the following technical effects:

According to the embodiment, based on the code disk with more than two pairs of magnetic poles, a plurality of durations of level signals corresponding to the number of magnetic poles can be obtained. According to the total number of windows of the code disk and a plurality of durations of level signals, the rotor preliminary code can be determined. Then, according to the predetermined code rule, the code starter is determined so as to obtain the correct order of rotor code. Since the durations of the level signals are varied, the different code orders of multiple level signals can form a variety of rotor codes. Therefore, compared with the related art, under the condition that the numbers of windows in the code disk are the same, the rotor identifiable codes can be greatly increased, thereby realizing the object of identifying a large number of rotor types with a small number of windows.

The above general description and the description below are exemplary and explanatory only and are not intended to limit the present disclosure.

BRIEF DESCRIPTION OF THE DRAWINGS

One or more embodiments are illustrated by means of the corresponding drawings, which do not constitute a limitation of the embodiments, elements having the same reference numerals in the drawings are shown as similar elements, and the drawings do not constitute a limitation of proportion, wherein.

DETAILED DESCRIPTION OF THE EMBODIMENTS

Figure 1:
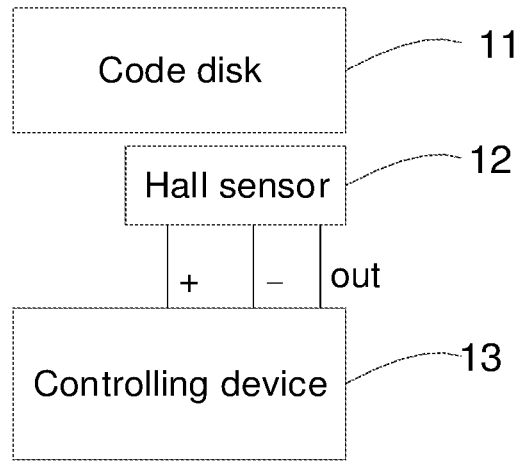
FIG. 1 is a schematic diagram of an identifying system for a centrifuge rotor provided by an embodiment of the present disclosure.

In order to enable a more detailed understanding of the features and technical content of the embodiments of the present disclosure, the implementation of the embodiments of the present disclosure will be described in detail below with reference to the accompanying drawings, which are for illustration only and are not intended to limit the embodiments of the present disclosure. In the following technical description for convenience of explanation, several details are provided for a full understanding of the disclosed embodiments. However, one or more embodiments may still be practiced without these details. In other instances, the well-known structures and devices may simplify the disclosure in order to simplify the drawings.

The terms "first", "second" and the like in the specification and claims of embodiments of the present disclosure and the above drawings are used to distinguish similar elements and are not necessarily used to describe a particular order or priority. It should be understood that the data used in this way can be interchanged where appropriate for the embodiments of the present disclosure described herein. Furthermore, the terms "include" and "have" and any variations thereof are intended to cover a non-exclusive inclusion.

Unless otherwise illustrated, the term "a plurality of" means two or more.

In the embodiment of the present disclosure, the character "I" indicates that the front element and rear element are in an "or" relationship. For example, A/B illustrates A or B.

The term "and/or" is an association relationship that describes elements, indicating that there can be three relationships. For example, A and/or B represent relationships: A, B, or A and B.

With reference to FIGS. 1, 4A to 4C, an identifying system for a centrifuge rotor includes a code disk 11 having a plurality of pairs of magnetic poles, a Hall sensor 12, and a controlling device 13. The code disk 11 is provided with a plurality of pairs of magnetic poles, and every pair of magnetic poles are arranged in the polarity order of NS or every pair of magnetic poles are arranged in the polarity order of SN. The code disk 11 is mounted on a rotor, such as a centrifuge rotor, and the arrangement of the magnetic poles represents the code of the rotor which can be identified to obtain the type of the rotor. The pair number of magnetic poles is more than two pairs. The Hall sensor 12 detects the polarity of the magnetic pole on the code disk 11 and outputs different level signals for different polarities. The controlling device 13 processes the output signal of the Hall sensor, to obtain the arrangement of the magnetic poles on the code disk 11, to obtain the rotor code.

In some embodiments, the Hall sensor is a bipolar Hall sensor with latch function. In a case where the N pole is detected, the Hall sensor outputs a high-level signal, and in a case where the S pole is detected, the Hall sensor outputs a low-level signal. The output signals from the Hall sensor are equivalent to a rising edge generated from the Hall sensor output signal in a case where the N pole is detected and a falling edge generated from the Hall sensor output signal in a case where the S pole is detected.

In some embodiments, the number of windows of the code disk is greater than 8, and the number of windows is a common divisor of 360. As an example, 12 windows are provided on the code disk, 2 pairs of magnetic poles are mounted on the 4 windows thereof, and the rest of the windows are open holes or mounted with a nonmagnetic material. The distance intervals of adjacent magnetic poles can be the same or not. It can be understood that if the 2 pairs of magnetic poles are all arranged in NS polarity order and the high-level signal is output while the N pole is detected, the 2 pairs of magnetic poles generate 4 level signals, which are high-level, low-level, high-level, and low-level, respectively. The rotor code is identified according to the durations of 4 level signals. With different distance intervals of adjacent magnetic poles, the level signals with different durations are generated, so as to identify the rotor code of different types. The high-level signal and the low-level signal generated by each pair of magnetic poles are the pair of signals corresponding to each other. Further, it should be noted that the 2 pairs of magnetic poles can be mounted on the code disk in different polarity order, i.e., arranged in NSSN or SNNS polarity. In this case, one high-level signal and one low-level signal are generated by the 2 pairs of magnetic poles, and the result of generating the level signal by the 2 pairs of magnetic poles is equal to that of one pair of magnetic poles.

Figure 2:
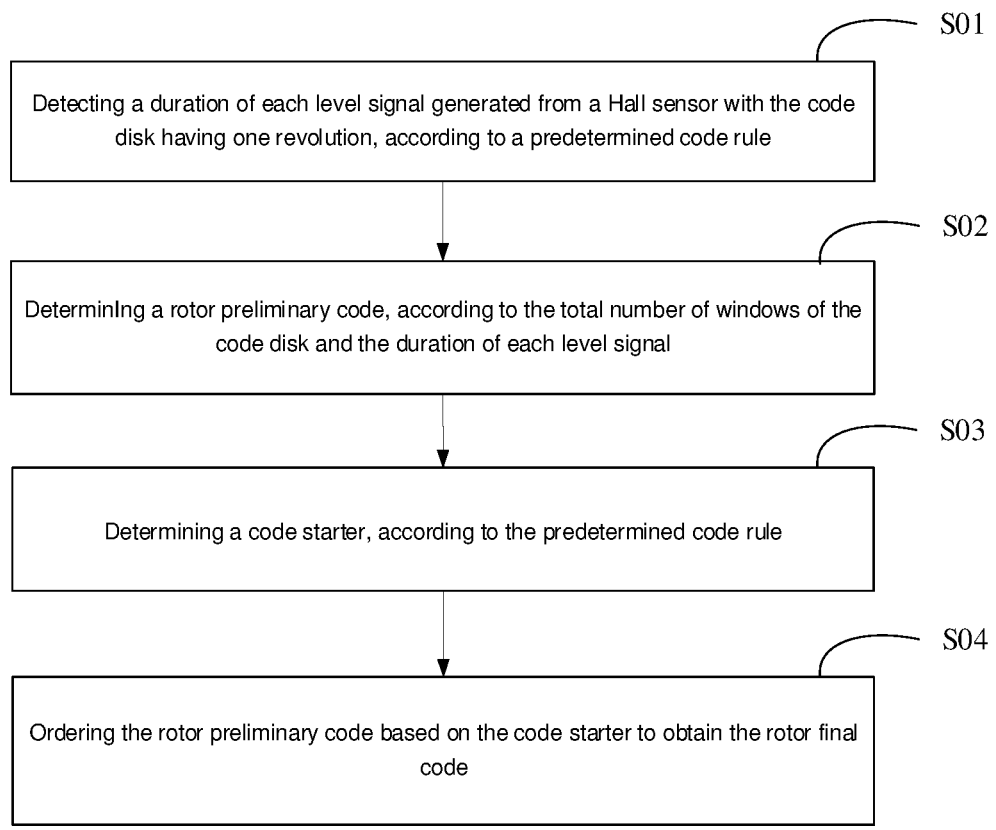
FIG. 2 is a schematic diagram of an identifying method for a centrifuge rotor provided by an embodiment of the present disclosure.

With reference to FIG. 2, the embodiment of the present disclosure provides an identifying method for a centrifuge rotor, including:

S01, detecting a duration of each level signal generated from a Hall sensor with the code disk having one revolution, according to a predetermined code rule.

In the embodiment, after the rotational speed of the centrifuge rotor reaches the predetermined rotational speed, the Hall sensor of the centrifuge rotor identifying system detects the level signal generated by the magnetic pole on the code disk, and the controlling device sequentially obtains the durations of every level signals generated with the code disk having one revolution. Optionally, before detecting the level signal, the rotational speed of the centrifuge rotor should be relatively stable for a period of time, so that the level signal can be detected when the rotational speed of the centrifuge rotor does not change dramatically in one mechanical cycle.

In some embodiments, a trigger signal for level signal detection is set in a predetermined code rule, that is, the controlling device obtains the duration of each level signal with the code disk having one revolution after the trigger signal is detected. As an example, a high-level signal or a rising edge signal may be configured to be the trigger signal. That is, when the level signal changes, the duration of each level signal in the code disk is detected.

It should be noted that the identifying method of the present embodiment is in a case where the rotation direction of the centrifuge rotor is given, that is, in a case where the centrifuge rotor rotates forward or reversely.

S02, determining a preliminary code, according to the total number of windows of the code disk and the duration of each level signal.

In some embodiments, the durations of a plurality of level signals on the code disk are obtained by the input timing and interrupt functions of the MCU (Microcontroller Unit) in the controlling device. The total number of windows in the code disk is given and can be written into the controlling device in advance. After corresponding processing the total number of windows of the code disk and the duration of each level signal, the controlling device obtains the preliminary code.

S03, determining a code starter, according to the predetermined code rule.

In the embodiment, a plurality of pairs of magnetic poles is provided on the code disk, so after obtaining the preliminary code, it is necessary to further determine the code starter, so as to obtain the rotor code with the correct order, which is, the rotor final code.

In some embodiments, based on a plurality of pairs of magnetic poles, two groups of level signals of different polarities can be generated, one group of high-level signals and one group of low-level signals, to obtain the arrangement of the magnetic poles on the code disk representing the rotor code, so as to further identify the type of the rotor. There are many identification rules for the code starter. Different identification rules can have different code orders, but the identification results, which are, the identifiable rotor types, are the same.

In some embodiments, the predetermined code rule is to determine the code starter based on the duration of the level signal. For example, in a case where 4 level signals are generated by 2 pairs of magnetic poles as above, if the rising edge is defined as the trigger signal for starting detection, the order of obtained the 4 level signals is a first high-level signal, a first low-level signal, a second high-level signal, and a second low-level signal. In a case where the durations of the first and second high-level signals are different, the starting position of the high-level signal with longer duration can be selected as the code starter, or the starting position of the high-level signal with shorter duration can be selected as the code starter. In a case where the durations of the first and second high-level signals are the same, the code starter can be selected according to the durations of the first and second low-level signals. Specifically, the starting position of the high-level signal before the low-level signal with longer duration can be selected as the code starter, or the starting position of the high-level signal before the low-level signal with shorter duration can be selected as the code starter. Therefore, according to the predetermined code rule, the code starter is determined.

S04, ordering the preliminary code based on the code starter to obtain the rotor final code.

In the embodiment, after determining the code starter, the preliminary code obtained before can be adjusted, which is, based on the information of the code starter and according to the obtaining order of the level signals, the preliminary code is reordered so as to obtain the final rotor code with the correct order. For example, the preliminary code order is $S_1S_2S_3 \ldots S_{2n}$. After determining that the level signal corresponding to $S_3$ is the code starter, the reordered rotor code is $S_3S_4 \ldots S_{2n}S_1S_2$ which is the final rotor code $S_1'S_2'S_3' \ldots S_{2n}'$, wherein $S_1'=S_3$, $S_2'=S_4 \ldots S_{2n-1}'=S_1$, $S_{2n}'=S_2$. In this way, the rotor code corresponding rotor type can be obtained after processing, and the rotor parameters can be searched in the rotor model table, for example, a rotor with code $S_1'S_2'S_3'S_4'=1119$ is a 4200 rpm horizontal rotor or a 36×5 ml fixed angle rotor, so as to determine whether the parameters set by users are reasonable or not.

With the identifying method for the centrifuge rotor provided by the embodiment of the present disclosure, more rotor types can be identified with a small number of windows. In the embodiment of the present disclosure, 85 rotor types can be identified according to the predetermined code rule based on 2 pairs of magnetic poles and 12 windows, as shown in the following table for details. The predetermined code rule defines the high-level as the trigger signal for detection, and the code rule of the starter defines the starting position of the high-level signal with shorter duration as the code starter, and defines the starting position of the high-level signal before the low-level signal with shorter duration as the code starter while the durations of the high-level signal are the same. $S_1$, $S_2$, $S_3$, and $S_4$ are preliminary codes corresponding to high-level, low-level, high-level, and low-level generated by 2 pair of magnetic poles.

TABLE 1

Rotor Final Code Group I for Different Types

| No. | $S_1'$ | $S_2'$ | $S_3'$ | $S_4'$ |
|---|---|---|---|---|
| 1 | 1 | 1 | 1 | 9 |
| 2 | 1 | 2 | 1 | 8 |
| 3 | 1 | 3 | 1 | 7 |
| 4 | 1 | 4 | 1 | 6 |
| 5 | 1 | 5 | 1 | 5 |
| 6 | 2 | 1 | 2 | 7 |
| 7 | 2 | 2 | 2 | 6 |
| 8 | 2 | 3 | 2 | 5 |
| 9 | 2 | 4 | 2 | 4 |
| 10 | 3 | 1 | 3 | 5 |
| 11 | 3 | 2 | 3 | 4 |
| 12 | 3 | 3 | 3 | 3 |
| 13 | 4 | 1 | 4 | 3 |
| 14 | 4 | 2 | 4 | 2 |
| 15 | 5 | 1 | 5 | 1 |

In Table 1, the code starter is determined according to the high-level signal before the low-level signal with shorter duration while the durations of the high-level signal are the same. In a case where the durations of the low-level signal are also the same, the starting position of the first high-level signal is selected as the code starter, and 15 rotor final codes for rotor types. For example, the preliminary code in FIG. 4B $S_1S_2S_3S_4=1515$, the durations T1 and T3 of the high-level signal are the same, and the final rotor code $S_1'S_2'S_3'S_4'=1515$, and the rotor type is No. 5 according to Table 1. For example, the preliminary code in FIG. 4C $S_1S_2S_3S_4=2523$, the durations T1 and T3 of the high-level signal are the same, and the final rotor code $S_1'S_2'S_3'S_4'=2325$, and the rotor type is No. 8 according to Table 1.

TABLE 2

Rotor Final Code Group II for Different Types

| No. | $S_1'$ | $S_2'$ | $S_3'$ | $S_4'$ |
|---|---|---|---|---|
| 1 | 1 | 1 | 2 | 8 |
| 2 | 1 | 2 | 2 | 7 |
| 3 | 1 | 3 | 2 | 6 |
| 4 | 1 | 4 | 2 | 5 |
| 5 | 1 | 5 | 2 | 4 |
| 6 | 1 | 6 | 2 | 3 |
| 7 | 1 | 7 | 2 | 2 |
| 8 | 1 | 8 | 2 | 1 |
| 9 | 1 | 1 | 3 | 7 |
| 10 | 1 | 2 | 3 | 6 |
| 11 | 1 | 3 | 3 | 5 |
| 12 | 1 | 4 | 3 | 4 |
| 13 | 1 | 5 | 3 | 3 |
| 14 | 1 | 6 | 3 | 2 |
| 15 | 1 | 7 | 3 | 1 |
| 16 | 1 | 1 | 4 | 6 |
| 17 | 1 | 2 | 4 | 5 |
| 18 | 1 | 3 | 4 | 4 |
| 19 | 1 | 4 | 4 | 3 |
| 20 | 1 | 5 | 4 | 2 |
| 21 | 1 | 6 | 4 | 1 |
| 22 | 1 | 1 | 5 | 5 |
| 23 | 1 | 2 | 5 | 4 |
| 24 | 1 | 3 | 5 | 3 |
| 25 | 1 | 4 | 5 | 2 |
| 26 | 1 | 5 | 5 | 1 |
| 27 | 1 | 1 | 6 | 4 |
| 28 | 1 | 2 | 6 | 3 |
| 29 | 1 | 3 | 6 | 2 |
| 30 | 1 | 4 | 6 | 1 |
| 31 | 1 | 1 | 7 | 3 |
| 32 | 1 | 2 | 7 | 2 |
| 33 | 1 | 3 | 7 | 1 |
| 34 | 1 | 1 | 8 | 2 |
| 35 | 1 | 2 | 8 | 1 |
| 36 | 1 | 1 | 9 | 1 |
| 37 | 2 | 1 | 3 | 6 |
| 38 | 2 | 2 | 3 | 5 |
| 39 | 2 | 3 | 3 | 4 |
| 40 | 2 | 4 | 3 | 3 |
| 41 | 2 | 5 | 3 | 2 |
| 42 | 2 | 6 | 3 | 1 |
| 43 | 2 | 1 | 4 | 5 |

TABLE 2-continued

Rotor Final Code Group II for Different Types

| No. | Rotor Final Code | | | |
|---|---|---|---|---|
| | $S_1'$ | $S_2'$ | $S_3'$ | $S_4'$ |
| 44 | 2 | 2 | 4 | 4 |
| 45 | 2 | 3 | 4 | 3 |
| 46 | 2 | 4 | 4 | 2 |
| 47 | 2 | 5 | 4 | 1 |
| 48 | 2 | 1 | 5 | 4 |
| 49 | 2 | 2 | 5 | 3 |
| 50 | 2 | 3 | 5 | 2 |
| 51 | 2 | 4 | 5 | 1 |
| 52 | 2 | 1 | 6 | 3 |
| 53 | 2 | 2 | 6 | 2 |
| 54 | 2 | 3 | 6 | 1 |
| 55 | 2 | 1 | 7 | 2 |
| 56 | 2 | 2 | 7 | 1 |
| 57 | 2 | 1 | 8 | 1 |
| 58 | 3 | 1 | 4 | 4 |
| 59 | 3 | 2 | 4 | 3 |
| 60 | 3 | 3 | 4 | 2 |
| 61 | 3 | 4 | 4 | 1 |
| 62 | 3 | 1 | 5 | 3 |
| 63 | 3 | 2 | 5 | 2 |
| 64 | 3 | 3 | 5 | 1 |
| 65 | 3 | 1 | 6 | 2 |
| 66 | 3 | 2 | 6 | 1 |
| 67 | 3 | 1 | 7 | 1 |
| 68 | 4 | 1 | 5 | 2 |
| 69 | 4 | 2 | 5 | 1 |
| 70 | 4 | 1 | 6 | 1 |

In Table 2, 70 rotor final codes of rotor types are obtained under the code rule of selecting the starting position of the high-level signal with shorter duration as the code starter. For example, the preliminary code in FIG. 4A $S_1S_2S_3S_4=1335$, the duration T1 of the high-level signal is shorter, the final rotor code $S_1'S_2'S_3'S_4'=1335$, and the rotor type is No. 11 according to Table 2. A total of 85 rotor final codes in Table 1 and Table 2, which can be identified for 85 types of centrifuge rotors.

Optionally, the step S01, as the controlling device detects the duration of each level signal generated from the Hall sensor with the code disk having one revolution according to the predetermined code rule, includes: defining a high-level or a low-level as the trigger signal for level signal detection. After detecting the trigger signal, the durations of every level signal generated from the Hall sensor are sequentially detected with the code disk having one revolution.

In the embodiment, the trigger signal is determined according to the predetermined code rule, and a high-level signal, i.e., a rising edge signal, can be defined as the trigger signal, or a low-level signal, i.e., a falling edge signal can be defined as the trigger signal. In this way, after detecting the trigger signal, the controlling device obtains the durations of every level signal with the code disk having one revolution, so as to obtain the preliminary code later.

Optionally, the step S02, as the control device determines the rotor preliminary coding according to the total number of holes of the coding disk and the durations of each level signal, includes:
  determining the unit duration according to the total number of windows of the code disk and the durations of each level signal. The unit duration is the time interval of adjacent windows.
  determining a window interval number of each level signal based on the unit duration.
  obtaining the preliminary code, according to the window interval number of each level signal.

In the embodiment, according to the duration of the level signal, the window interval numbers corresponding to every level signal are determined. Then, according to the obtaining order, the preliminary code can be obtained after ordering the window interval numbers.

The first step is to determine the unit duration, which is, the time interval of adjacent windows. In some embodiments, when the total number of windows in the code disk is given, the unit duration can be obtained by obtaining the duration of one revolution of the code disk. As an example, the duration T1+T2+T3+T4 of one revolution of the code disk is equal to the sum of the durations of the level signals generated by the magnetic poles on the code disk, and then combined with the total number S of windows of the code disk, the unit duration T can be obtained, where T=(T1+T2+T3+T4)/S. The second step is to determine the window interval number of each level signal $S_1S_2S_3S_4$, for example in FIG. 4A $S_1S_2S_3S_4=1335$. In some embodiments, the quotient of the duration of each level signal and the unit duration is the window interval number for each level signal, where the unit duration and the duration of each level signal are given. The third step is to determine the rotor final code, such as $S_1'S_2'S_3'S_4'=1335$ which is No. 11 rotor types according to Table 2. In some embodiments, the window interval numbers for each level signal are reordered according to the obtaining order of each level signal, thereby obtaining a preliminary code.

Thus, rotor final codes can be obtained by detecting the level signals generated by a plurality of pairs of magnetic poles on the code disk to identify different types of rotors.

Optionally, the step S21, as determining the unit duration according to the total number of windows of the code disk and the duration of each level signal, includes:
  calculating $$T_u = \sum_{i=1}^{2n} T_i / S$$

Where $T_u$ is the unit duration, $T_i$ is the duration of the i-th level signal, S is the total number of windows in the code disk, n is the pair number of magnetic poles, and i is the number of level signals, i=1,2,3 ... 2n.

In the embodiment, the durations of each level signal are accumulated to obtain the duration $\Sigma_{i=1}^{2n} T_i$ of one revolution of the code disk. Combined with the total number S of windows in the code disk, the time interval between adjacent windows, which is, the unit duration T, can be obtained.

Optionally, the step, as the controlling device determines the window interval number of each level signal based on the unit duration, includes:
  calculating $S_i = T_i / T_u.$ According to the principle of rounding, the window interval number Si is rounded.

Ti is the duration of the i-th level signal, Tu is the unit duration, Si is the window interval numbers of the i-th level signal, and i is the number of level signals.

In some embodiments, due to the communication delay, there is a certain error in the duration of the level signal obtained by the controlling device within the allowable range. Thus, when calculating the window interval numbers, there may be a case where the window interval numbers is not an integer. In view of this situation, according to the principle of rounding, the window interval numbers are rounded to obtain the rotor code, so as to avoid the error rate caused by upward rounding or downward rounding, and to improve the identifying accuracy of the rotor code.

Optionally, after rounding the window interval numbers Si by the controlling device, the method further includes: in a case where the sum of all the rounded window interval numbers is different from the total number of windows of the code disk, the Hall sensor detects the duration of each level signal in the code disk again.

In some embodiments, it is necessary to verify the rounded window interval numbers to ensure that the sum of the rounded window interval numbers is equal to the total number of windows in the code disk, thus improving the identifying accuracy of the rotor code. If the verification fails, it indicates that the rounded window interval numbers are unreasonable, indicating that the duration of the detected level signal is wrong, and the duration of each level signal in the code disk needs to be detected again, which is, the step S01 is re-executed until the rounded window interval number are reasonable.

Optionally, the step, as the controlling device obtains a preliminary code according to the window interval numbers of each level signal, includes: sequentially ordering the window interval numbers of each level signal according to the obtaining order of each level signal to obtain the preliminary code.

In some embodiments, the rotor code order is based on the obtaining order of each level signal, i.e., the level signal obtained first, which is ranked first in the rotor code. For example, Si is the window interval number for the i-th level signal, and the preliminary code is $S_1 S_2 S_3 \ldots S_{2n}$. It can be understood that after determining the code starter, such as $S_3$, reordering the preliminary codes, with the code starter as the starting position, according to the obtaining order, to obtain the final rotor code $S_1' S_2' S_3' S_{2n}'$, where $S_1'=S_3$, $S_2'=S_4, \ldots S_{2n-1}'=S_1, S_{2n}'=S_2$.

Optionally, the step S03, as the controlling device determines the code starter according to the predetermined code rule, includes:
  in a case where the high-level is the trigger signal detected by the level signal, if the durations of a plurality of high-level signals are not identical, the starting position of the shortest or longest high-level signal is selected as the code starter of the rotor final code. If the durations of a plurality of high-level signals are identical, the starting position of the high-level signal before the shortest or longest low-level signal is selected as the starter of the rotor final code; or,
  in a case where the low-level is the trigger signal detected by the level signal, if the durations of a plurality of low-level signals are not identical, the starting position of the shortest or longest low-level signal is selected as the code starter of the preliminary code. If the durations of a plurality of low-level signals are identical, the starting position of the low-level signal before the shortest or longest high-level signal is selected as the code starter of the rotor final code.

As an example, with 2 pairs of magnetic poles, the starting position of the high-level signal with shorter duration is selected as the code starter. In a case where the durations of the high-level signal are different, if the duration of the first high-level signal is shorter than the duration of the second high-level signal, the starting position of the first high-level signal is selected as the code starter. If the duration of the first high-level is longer than the duration of the second high-level signal, the starting position of the second high-level signal is selected as the code starter. In a case where the durations of the high-level signals are the same, if the duration of the first low-level signal is shorter than or equal to the duration of the second low-level signal, the starting position of the first high-level signal is selected as the code starter. If the duration of the first low-level is longer than the duration of the second low-level signal, the starting position of the second high-level signal is selected as the code starter. In this way, there are 4 kinds of identification rules for the code starter, and different identification rules can be selected to have different code orders.

The above method is adaptable to be employed in the case where the low-level is a trigger signal detected by the level signal and the code starter is determined according to the duration of the level signal.

Optionally, in a case where the high-level is the trigger signal detected by the level signal, if the durations of a plurality of high-level signals are not identical, the starting position of the shortest or longest high-level signal is selected as the code starter of the rotor final code. If the shortest or longest high-level signal is not the only one, the code starter is determined according to the duration of the high-level signal before the shortest or longest low-level signal. Or, in a case where the low-level is the trigger signal detected by the level signal, if the durations of a plurality of low-level signals are not identical, the starting position of the shortest or longest low-level signal is selected as the code starter of the rotor final code. If the shortest or longest low-level signal is not the only one, the code starter is determined according to the duration of the low-level signal before the shortest or longest high-level signal.

In some embodiments, in a case where the number pairs of magnetic poles are more than 3 pairs, there may be a situation where the longest or shortest high-level signal or low-level signal is not only one, in which case the code starter needs to be further determined according to the duration of the high-level signal before the selected high-level signal, or the code starter needs to be determined according to the duration of the high-level signal before the selected low-level signal.

As another example, in a case where there are more than 3 pairs of magnetic poles, if the durations of a plurality of high-level signals are not the same, the starting position of the high-level signal with the longest or shortest duration can be selected as the code starter. For example, 3 pairs of magnetic poles generate 6 level signals. If 2 of the 3 high-level signals have the same duration, and if the third duration is the shortest, the starting position of the third high-level signal corresponding to the shortest duration can be selected as the code starter. If the duration of 2 high-level signals with the same duration is the shortest, the code starter is determined according to the durations of 2 low-level signals before the 2 high-level signals with the same duration, and the starting position of the high-level signal corresponding to the low-level signal with shorter duration can be the code starter. Similarly, the above method is adapted to the case where the starting position of the high-level signal with the longest duration is selected as the code starter. By analogy, it can be known that the starting position of the shortest or longest low-level signal is selected to be the code starter. In a case where the 3 high-level signals are identical, the code starter is determined according to the durations of the low-level before the high-level.

In the case where a large number of magnetic pole pairs, as an example, the code rule is that the starting position of the high-level signal with the shortest duration is selected to be the code starter. It is possible that the high-level signal with the shortest duration is not only one, and the code starter needs to be determined according to the duration of the corresponding low-level signal. In this case, it is also possible that the durations of the corresponding low-level signal are the same, and at this time, the code starter cannot be determined according to the high-level signal with the shortest duration and the corresponding low-level signal. The code starter is determined based on the duration of the second shortest high-level signal and the corresponding low-level signal, and so on, until the code starter can be determined.

Optionally, the step of S04, as the controlling device orders the preliminary code based on the code starter to obtain the rotor final code, includes: based on the code starter, controlling the preliminary code cyclic displacement. The preliminary code after cyclic displacement is the rotor final code.

In the embodiment, after determining the code starter, the preliminary code is controlled to circularly move left or circularly move right until the preliminary code takes the rotor starter as the starting position, thereby obtaining the final rotor code. For example, taking the preliminary code $S_1S_2S_3 \ldots S_{2n}$ as an example, if the duration of the level signal corresponding to $S_3$ is determined to be the code starter, the rotor final code $S_3S_4 \ldots S_{2n}S_1S_2$ can be obtained after cyclic displacement two bits to the left. Or after cyclically displacing 2n-2 bits to the right, the rotor final code $S_1'S_2'S_3'S_{2n}'$ is obtained, where $S_1'=S_3$, $S_2'=S_4$ ... $S_{2n-1}'=S_1$, $S_{2n}'=S_2$.

Optionally, the step of S04, as the controlling device orders the preliminary code based on the code starter to obtain the rotor final code, further includes:

S05, the controlling device searches the target rotor according to the corresponding relationship between the rotor type table and the rotor final code. If the search is successful, the rotor identification is prompted successfully. The operating parameters of the target rotor are obtained, and the centrifuge rotor is controlled to run under the operating parameters.

In the embodiment, after determining the rotor final code, the rotor type table is searched to obtain the operating parameters of the target rotor, and then whether the parameters input by the user are reasonable or not is determined. If the parameters are reasonable, the centrifuge receives the signal that the rotor identification is successful, and the centrifuge can accelerate normally. If it is unreasonable, give a warning.

Optionally, the total number of windows on the code disk is a common divisor of 360, and the total number of windows on the code disk is greater than or equal to 8.

Figure 3:
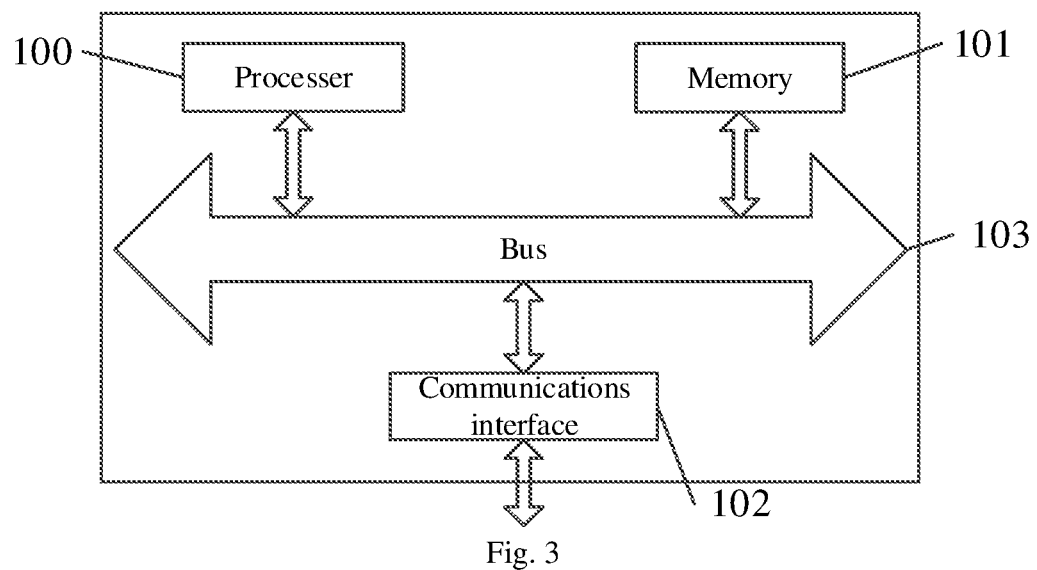
FIG. 3 is a schematic diagram of another identifying system for a centrifuge rotor provided by an embodiment of the present disclosure.
Figure 4A:
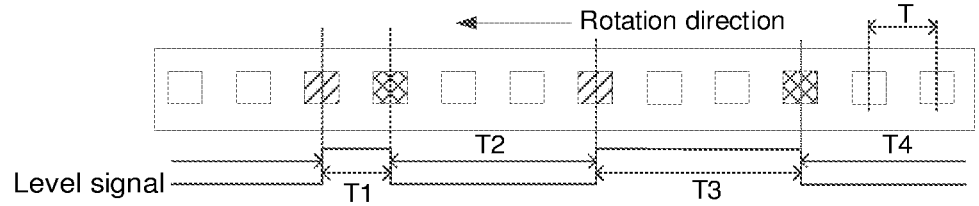
FIGS. 4A to 4C are level signal diagrams of the identifying method for the centrifuge rotor provided by the embodiment of the present disclosure, illustrating the circular shape code disk as a linear shape.
Figure 4B:
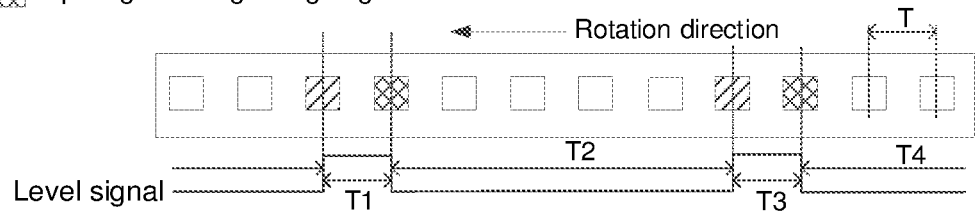
Figure 4C:
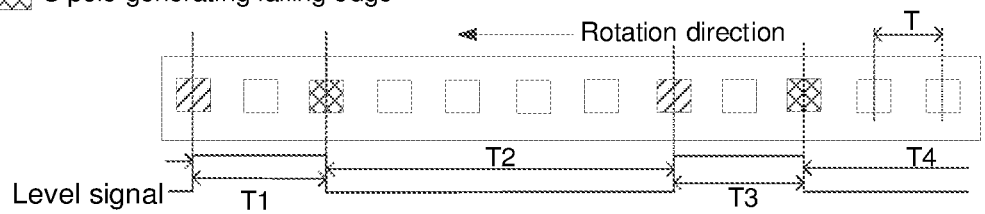

As shown with reference to FIG. 3, an embodiment of the present disclosure provides an identifying system for a centrifuge rotor including a processor 100, a memory 101, and a code disk. Optionally, the system may also include a communication interface 102 and a bus 103. The processor 100, the communication interface 102, and the memory 101 can communicate with each other through the bus 103. The communication interface 102 may be configured for information transmission. Processor 100 may invoke logic instructions in memory 101 to perform the method for centrifuge rotor identification of the above-described embodiments.

Further, the logic instructions in the memory 101 described above may be realized in the form of software functional units and may be stored in a computer readable storage medium when sold or used as a separate product.

As a computer readable storage medium, the memory 101 may be v to store software programs, computer executable programs, such as program instructions/modules corresponding to the methods in embodiments of the present disclosure. The processor 100 executes functional present disclosures as well as data processing by running program instructions/modules stored in the memory 101 i.e., implementing the method for centrifuge rotor identification in the above-described embodiments.

The memory 101 may include a stored program area and a stored data area wherein the stored program area may store a present disclosure program required for at least one function of the operating system. The storage data area may store data created according to the use of the terminal device. In addition, the memory 101 may include a high-speed random access memory and may also include a non-volatile memory.

Embodiments of the present disclosure provide a computer-readable storage medium storing computer-executable instructions configured to perform the above-described method for centrifuge rotor identification.

Embodiments of the present disclosure provide a computer program product including a computer program stored on a computer-readable storage medium, the computer program including program instructions that, when executed by a computer, cause the computer to perform the above-described method for centrifuge rotor identification.

The computer-readable storage medium may be a transient computer-readable storage medium or a non-transient computer-readable storage medium.

The technical solution of the disclosed embodiments may be embodied in the form of a software product stored in a storage medium, including one or more instructions for causing a computer device (which may be a personal computer, server, or network device, etc.) to perform all or part of the steps of the method of the disclosed embodiments. The aforementioned storage medium may be a non-transient storage medium, including a U disk, a mobile hard disk, a Read-Only Memory (ROM), a Random Access Memory (RAM), a magnetic disk or an optical disk, and other media capable of storing program codes, or may be a transient storage medium.

The above description and drawings sufficiently illustrate embodiments of the present disclosure to enable those skilled in the art to practice them. Other embodiments may include structural logical electrical procedural and other changes. Embodiments represent only possible variations. Unless explicitly required, individual parts and functions are optional, and the order of operation can vary. Portions and features of some embodiments may be included in or in place of portions and features of other embodiments. Furthermore the terms used in the present disclosure are used only to describe embodiments and are not used to limit the claims. As used in the embodiments and in the description of the claims, the singular forms of "a" (a), "an" (an) and "the" (the) are intended to include the plural forms as well, unless the context clearly indicates. Similarly, the term "and/or" as used in this present disclosure means encompassing one or more associated lists of any and all possible combinations. Additionally, when used in this present disclosure, the term "compose" and its variants "compose" and/or compose, etc. refer to the presence of stated features, totals, steps, operations, elements, and/or components, but do not exclude the presence or addition of one or more other features, totals, steps, operations, elements, components, and/or groupings of these. In the absence of further limitations, an element defined by the phrase "includes an . . . " does not preclude the existence of another identical element in the process, method or apparatus in which the element is included. Herein each embodiment may be highlighted as being different from the other embodiments and the same similar parts between the various embodiments may be referred to with respect to each other. For the method, product, etc. disclosed by the embodiment, if it corresponds to the method portion disclosed by the embodiment, reference can be made to the description of the method portion where relevant.

Those skilled in the art will appreciate that the various example units and algorithm steps described in connection with the embodiments disclosed herein can be implemented in electronic hardware or a combination of computer software and electronic hardware. Whether these functions are performed in hardware or software can depend on the specific present disclosure and design constraints of the technical solution. The skilled artisan may use different methods for each particular present disclosure to implement the described functionality but such implementation should not be considered outside the scope of the disclosed embodiments. It will be apparent to the skilled person that for convenience and conciseness of description, the specific operating processes of the above-described systems, apparatuses and units may be referred to the corresponding processes in the aforementioned method embodiments and will not be repeated herein.

In the embodiments disclosed herein, the disclosed methods, products (including but not limited to devices, devices, etc.) may be implemented in other ways. For example, the above-described embodiment of the apparatus is only schematic, for example, the division of the unit may be only a logical function division, and in practice there may be another division mode, for example, multiple units or components may be combined or integrated into another system, or some features may be ignored or not performed. In addition, the coupling or direct coupling or communication connection between each other shown or discussed may be indirect coupling or communication connection through some interface, device or unit, and may be electrical, mechanical or other form. The elements illustrated as separate elements may or may not be physically separated, and the elements displayed as elements may or may not be physical elements, i.e., may be located in one place, or may be distributed over a plurality of network elements. Some or all of the units can be selected according to actual needs to realize the embodiment. In addition, each functional unit in the embodiment of the present disclosure may be integrated in one processing unit, each unit may exist physically alone, or two or more units may be integrated in one unit.

The flowcharts and block diagrams in the accompanying drawings illustrate the architecture functionality and operation of possible implementations of systems methods and computer program products according to embodiments of the present disclosure. In this regard, each block in a flow chart or block diagram may represent a module, program segment, or part of code containing one or more executable instructions for performing a specified logical function. In some alternative implementations, the functions indicated in the boxes may also occur in a different order than those indicated in the drawings. For example, two successive boxes can actually be executed substantially in parallel, or they can sometimes be executed in reverse order, depending on the functionality involved. In the description corresponding to the flowcharts and block diagrams in the drawings, the operations or steps corresponding to different blocks may also occur in a different order than that disclosed in the description, and sometimes there is no specific order between the different operations or steps. For example, two successive operations or steps can actually be performed substantially in parallel, or they can sometimes be performed in reverse order, depending on the functionality involved. Each block in the block diagram and/or flow chart, and a combination of the blocks in the block diagram and/or flow chart, may be implemented in a dedicated hardware-based system that performs a specified function or action or may be implemented in a combination of dedicated hardware and computer instructions.

The invention claimed is:

1. A identifying method for a centrifuge rotor, based on an identifying system for the centrifuge rotor comprising a code disk having a plurality of pairs of magnetic poles, a Hall sensor, and a controlling device; the method comprising: detecting a duration of each level signal generated from the Hall sensor with the code disk having one revolution according to a predetermined code rule; determining a preliminary code according to a total number of windows of the code disk and the duration of each level signal; determining a code starter according to the predetermined code rule; and ordering the preliminary code to obtain a rotor final code based on the code starter, to identify rotor types according to the rotor final code, wherein the determining a preliminary code according to the total number of windows of the code disk and the duration of each level signal, comprises: determining a unit duration according to the total number of windows of the code disk and the duration of each level signal; determining a window interval number of each level signal based on the unit duration; and obtaining a preliminary code according to the window interval number of each level signal; wherein the unit duration is an interval duration of adjacent windows, wherein the determining the unit duration according to the total number of windows of the code disk and the duration of each level signal comprises:

calculating $$T_u = \sum_{i=1}^{2n} T_i/S$$

where $T_u$ is the unit duration, T is a duration of i-th level signal, S is the total number of windows in the code disk, n is pair number of magnetic poles, and i is number of level signals, where i=1,2,3, ... 2n.

2. The method according to claim 1, wherein the determining the window interval number of each level signal based on the unit duration, comprises: calculating $$S_i = T/T_u;$$

and rounding the window interval numbers Si according to principle of rounding; where T is the duration of the i-th level signal, $T_u$ is the unit duration, Si is the window interval numbers of i-th level signal, and i is number of level signals, where i=1,2,3, ... 2n.

3. The method according to claim 2, after rounding the window interval number Si according to principle of rounding, further comprising:

detecting the duration of each level signal generated from the Hall sensor when the code disk having one revolution, in case where a sum of all window interval numbers after rounding is different from the total window number of the code.

4. The method according to claim 2, wherein the determining the window interval number of each level signal based on the unit duration, comprises:
calculating $$S_i = T_i/T_u.$$

and
rounding the window interval numbers Si according to principle of rounding;
where $T_i$ is the duration of the i-th level signal, $T_u$ is the unit duration, Si is the window interval numbers of i-th level signal, and i is number of level signals, where i=1,2,3 . . . 2n.

5. The method according to claim 2, wherein the detecting a duration of each level signal generated from the Hall sensor with the code disk having one revolution according to a predetermined code rule comprises:
defining a trigger signal for a level signal detection; and
after detecting the trigger signal, detecting the duration of each level signal generated from the Hall sensor with the code disk having one revolution.

6. The method according to claim 5, wherein the determining a code starter according to the predetermined code rule comprises:
in case where a high-level is defined as the trigger signal in the level signal detection, if the durations of a plurality of high-level signals are not identical, the starting position of the high-level signal with the shortest duration is selected as the code starter; and
if the durations of a plurality of high-level signals are identical, the starting position of the high-level signal before the low-level signal with the shortest duration is selected as the code starter.

7. The method according to claim 1, wherein the ordering the preliminary code to obtain a rotor final code, based on the code starter, comprises:
controlling the preliminary code cyclic displacement based on the code starter;
wherein the rotor preliminary code after cyclic displacement is the rotor final code.

8. An identifying system for a centrifuge rotor comprising: a code disk, a Hall sensor, a processor, and a memory storing program instructions, wherein
the code disk has a plurality of pairs of magnetic poles;
the Hall sensor is bipolar and has a latch function; and
the processor is configured to execute the identifying method for the centrifuge rotor according to claim 1 when the program instructions are operated.

9. The method according to claim 5, wherein the determining a code starter, according to the predetermined code rule comprises:
in case where a high-level is defined as the trigger signal in the level signal detection, if the durations of a plurality of high-level signals are not identical, the starting position of the high-level signal with the shortest duration is selected as the code starter; and
if the durations of a plurality of high-level signals are identical, the starting position of the high-level signal before the low-level signal with the longest duration is selected as the code starter.

10. The method according to claim 5, wherein the determining a code starter, according to the predetermined code rule comprises:
in case where a high-level is defined as the trigger signal in the level signal detection, if the durations of a plurality of high-level signals are not identical, the starting position of the high-level signal with the longest duration is selected as the code starter; and
if the durations of a plurality of high-level signals are identical, the starting position of the high-level signal before the low-level signal with the shortest duration is selected as the code starter.

11. The method according to claim 5, wherein the determining a code starter, according to the predetermined code rule comprises:
in case where a high-level is defined as the trigger signal in the level signal detection, if the durations of a plurality of high-level signals are not identical, the starting position of the high-level signal with the longest duration is selected as the code starter; and
if the durations of a plurality of high-level signals are identical, the starting position of the high-level signal before the low-level signal with the longest duration is selected as the code starter.

12. The method according to claim 5, wherein the determining a code starter, according to the predetermined code rule comprises:
in case where a low-level is defined as the trigger signal detected in the level signal detection, if the durations of a plurality of low-level signals are not identical, the starting position of the low-level signal with the shortest duration is selected as the code starter; and
if the durations of a plurality of low-level signals are identical, the starting position of the low-level signal before the high-level signal with the shortest duration is selected as the code starter.

13. The method according to claim 5, wherein the determining a code starter, according to the predetermined code rule comprises:
in case where a low-level is defined as the trigger signal detected in the level signal detection, if the durations of a plurality of low-level signals are not identical, the starting position of the low-level signal with the shortest duration is selected as the code starter; and
if the durations of a plurality of low-level signals are identical, the starting position of the low-level signal before the high-level signal with the longest duration is selected as the code starter.

14. The method according to claim 5, wherein the determining a code starter, according to the predetermined code rule comprises:
in case where a low-level is defined as the trigger signal detected in the level signal detection, if the durations of a plurality of low-level signals are not identical, the starting position of the low-level signal with the longest duration is selected as the code starter; and
if the durations of a plurality of low-level signals are identical, the starting position of the low-level signal before the high-level signal with the shortest duration is selected as the code starter.

15. The method according to claim 5, wherein the determining a code starter, according to the predetermined code rule comprises:
in case where a low-level is defined as the trigger signal detected in the level signal detection, if the durations of a plurality of low-level signals are not identical, the starting position of the low-level signal with the longest duration is selected as the code starter; and
if the durations of a plurality of low-level signals are identical, the starting position of the low-level signal before the high-level signal with the longest duration is selected as the code starter.

16. The method according to claim 1, wherein the ordering the preliminary code to obtain a rotor final code, based on the code starter, comprises: controlling the preliminary code cyclic displacement based on the code starter; wherein the rotor preliminary code after cyclic displacement is the rotor final code.

17. The method according to claim 1, wherein the ordering the preliminary code to obtain a rotor final code, based on the code starter, comprises: controlling the preliminary code cyclic displacement based on the code starter; wherein the rotor preliminary code after cyclic displacement is the rotor final code.

18. The method according to claim 2, wherein the ordering the preliminary code to obtain a rotor final code, based on the code starter, comprises:

controlling the preliminary code cyclic displacement based on the code starter;

wherein the rotor preliminary code after cyclic displacement is the rotor final code.

* * * * *